United States Patent
Mach

(10) Patent No.: US 11,533,223 B2
(45) Date of Patent: *Dec. 20, 2022

(54) SYSTEMS AND METHODS FOR NETWORK MANAGEMENT

(71) Applicant: Ivanti, Inc., South Jordan, UT (US)

(72) Inventor: Roman Mach, Bothell, WA (US)

(73) Assignee: Ivanti, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,408

(22) Filed: Jan. 18, 2021

(65) Prior Publication Data

US 2021/0288875 A1    Sep. 16, 2021

Related U.S. Application Data

(63) Continuation of application No. 15/932,205, filed on Feb. 16, 2018, now Pat. No. 10,897,393, which is a continuation of application No. 14/503,664, filed on Oct. 1, 2014, now Pat. No. 9,900,211.

(51) Int. Cl.
*G06F 15/16* (2006.01)
*H04L 41/0806* (2022.01)
*H04L 41/12* (2022.01)
*H04L 67/10* (2022.01)
*H04L 41/084* (2022.01)
*H04L 41/08* (2022.01)
*H04L 41/28* (2022.01)
*H04L 41/0253* (2022.01)

(52) U.S. Cl.
CPC ........ *H04L 41/0806* (2013.01); *H04L 41/084* (2013.01); *H04L 41/0883* (2013.01); *H04L 41/12* (2013.01); *H04L 67/10* (2013.01); *H04L 41/0253* (2013.01); *H04L 41/28* (2013.01)

(58) Field of Classification Search
CPC ............... H04L 41/0806; H04L 41/084; H04L 41/0883; H04L 41/12; H04L 67/10; H04L 41/0253; H04L 41/28
USPC ....................................................... 709/222
See application file for complete search history.

(56) References Cited

U.S. PATENT DOCUMENTS

| | | | | |
|---|---|---|---|---|
| 2002/0169776 A1* | 11/2002 | Tuunanen | ........... | H04L 65/1096 |
| 2009/0288071 A1* | 11/2009 | Seidman | ................... | G06F 8/65 |
| | | | | 717/126 |
| 2015/0278076 A1* | 10/2015 | Bs | ....................... | G06F 11/3664 |
| | | | | 714/38.1 |

FOREIGN PATENT DOCUMENTS

| | | | | |
|---|---|---|---|---|
| EP | 2639713 A1 * | 9/2013 | ............. | G06F 16/93 |
| EP | 2891977 A1 * | 7/2015 | ......... | G06F 9/45558 |

OTHER PUBLICATIONS

Service animation integrating call processing and management scripts P. Combes;B. Renard;M. Alabau;L. Castaignet;N. Renaud IN'98. 7th IEEE Intelligent Network Workshop Proceedings (Cat. No. 98TH8364) (Year: 1998).*

(Continued)

*Primary Examiner* — Younes Naji
*Assistant Examiner* — Oluwatosin M Gidado

(57) ABSTRACT

A method for managing nodes is disclosed. The method includes testing a management script on a management server for managing at least one node. The method also includes receiving administrator validation to distribute the management script. The method further includes sending the validated management script to one or more management servers on one or more networks.

20 Claims, 11 Drawing Sheets

(56) References Cited

OTHER PUBLICATIONS

Automatically Generating Test Scripts for GUI Testing Muneyoshi Iyama; Hiroyuki Kirinuki;Haruto Tanno;Toshiyuki Kurabayashi 2018 IEEE International Conference on Software Testing, Verification and Validation Workshops (ICSTW) Year: 2018 | Conference Paper | Publisher: IEEE (Year: 2018).*

* cited by examiner

SYSTEMS AND METHODS FOR NETWORK MANAGEMENT

CROSS-REFERENCE TO RELATED APPLICATION(S)

This application is a continuation of U.S. application Ser. No. 15/932,205, filed Feb. 16, 2018, which is a continuation of U.S. application Ser. No. 14/503,664, filed Oct. 1, 2014, now U.S. Pat. No. 9,900,211, the disclosures of which are incorporated by reference herein in its entireties.

TECHNICAL FIELD

The present disclosure generally relates to computers and computer-related technology. More specifically, the present disclosure relates to systems and methods for adding new devices to a cloud-based network management system.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with networks is that new devices may not be easily discoverable or configurable under protocols commonly used. Additionally, the process of discovering and configuring new devices may be time consuming and complex. As can be observed from this discussion, systems and methods that make discovering and configuring new devices uncomplicated and time efficient may be beneficial to the management of a computer network.

DETAILED DESCRIPTION

Figure 1:
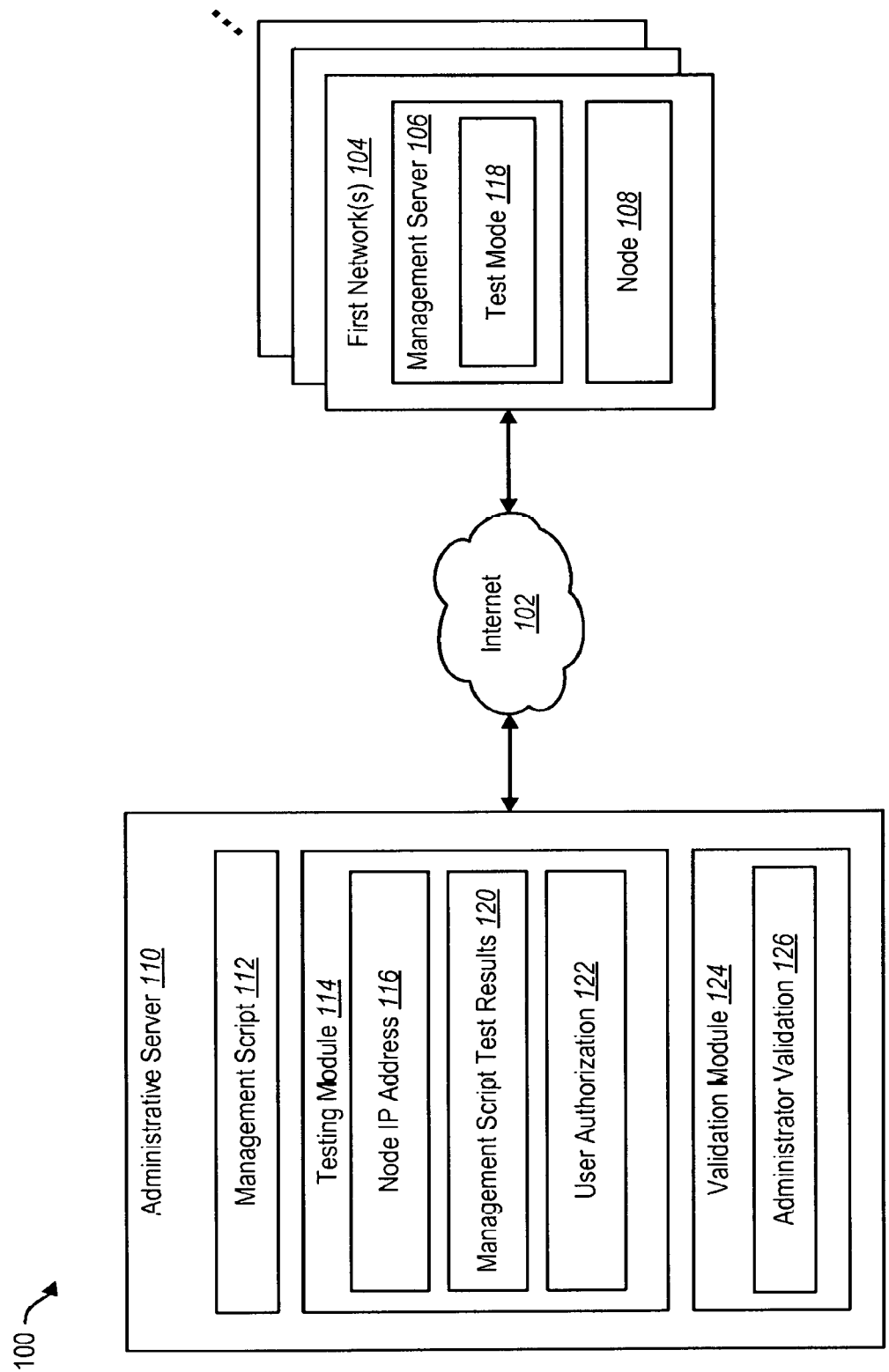
FIG. 1 is a block diagram illustrating one configuration of a cloud-based network that includes a plurality of electronic devices that are in electronic communication with one another via an Internet connection.

A method for managing nodes is disclosed. A management script is tested on a management server for managing at least one node. An administrator validation to distribute the management script is received. The validated management script is sent to one or more management servers on one or more networks.

The management script may comprise instructions to retrieve at least one identifier of an unmanaged node. The management script may also comprise instructions to retrieve at least one core parameter of the unmanaged node. The management script may further comprise instructions to retrieve at least one unmanaged node configurations. The management script may further comprise instructions to apply the unmanaged node configuration to one or more nodes. The management script may be authored by a user in a browser based interface or other interface. The management script may be validated for distribution by an administrative server administrator in a browser based interface or other interface.

The management server identifies an internet protocol address for an unmanaged node in a first network. The management script may be sent to a first management server when the management script is tested, wherein the first management server processes the management script in a test mode to discover and configure the unmanaged node. Management script test results from the first management server may be received when the management script is tested. A management script is considered validated if the test results are successful. Test results are bound to the script contents at the time of testing, not to a named script.

The method may further comprise receiving user authorization for multi-tenant distribution of the management script. The validated management script may be sent to one or more management servers of an entire customer base. The one or more management servers may apply the management script by reading a known identifier of the unmanaged node. Upon deployment of the management script, one or more unmanaged nodes listed in a signature cache of unmanaged nodes are immediately discovered and can be configured by the management script. The unmanaged nodes may be discovered by the one or more management servers independent of the firmware version installed on the unmanaged nodes. The method may be performed in a cloud-based multi-tenant architecture.

An administrative server for managing nodes is disclosed. The administrative server includes a processor. The administrative server includes memory in electronic communication with the processor. The administrative server includes instructions stored in the memory. The instructions are executable to test a management script on a management server for managing at least one node. The instructions are executable to receive administrator validation to distribute the management script. The instructions are executable to send the validated management script to one or more management servers on one or more networks.

As indicated above, aspects of the present disclosure are directed to improvements related to the discovery and configuration of new electronic devices on a computer network. When a new electronic device is introduced to the marketplace, the device may often employ discovery and configuration procedures and protocols that are not compatible with a purchaser's existing computer network. Because of this, purchasers of new electronic devices may resort to manual techniques of device discovery and configuration.

One known manual discovery and configuration technique may rely on simplistic device specific programming, such as Simple Network Management Protocol (SNMP). For some non-wireless products, this may be adequate. However, for wireless devices SNMP may be unable to perform increasingly desired operations beyond those of basic device identification. For example, wireless management capabilities vary significantly from device to device depending on the intended use of a device (e.g., an access point or a more complex aggregating switch). A device acting as an access point may have drastic differences in management capability compared to a more complex aggregating switch. Further, devices produced by different device manufacturers may employ differing wireless management capabilities as there may not be an embraced standard. Similar differences in management capability may also arise in non-wireless device types as well. Therefore, SNMP may not be adequate for efficient management of the many various devices that may possibly be implemented on a computer network.

Other known discovery and configuration methods may utilize more involved coding options, such as drivers. While these complex coding programs may perform more advanced discovery and configuration operations, coded solutions produced by this method are not easily shared or made immediately available for others to utilize. Because of this, the owner of each new electronic device must create a complex driver; a method that is highly complicated and time consuming. Further, device discovery and configuration methods may often be dependent on firmware versioning. Because of this dependency, an owner of each electronic device may need to employ many different discovery and configuration methods to manage similar or identical devices operating different firmware versions. Thus, discovering and configuring devices may be burdensome.

As demonstrated, there is a need for systems and methods for rapidly discovering and configuring an electronic device on a computer network. Further, there is a need for systems and methods that may also be easily shared and immediately available for others owning the same device to implement. Examples of others owning the same device may include individuals that do not share computer-based access between their computing devices, two or more enterprises employing the same devices on separate unrelated networks, etc. Some configurations of the systems and methods disclosed herein may facilitate this rapid device discovery and configuration, and may further enable such immediate sharing. Additionally, compared to other known techniques the systems and methods disclosed herein may reduce the complexity and time requirements of discovering and configuring new devices. Aspects of the present disclosure will be described in relation to a computing network that includes various components for managing computing devices belonging to an enterprise and components that cross multiple enterprises.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a cloud-based network 100 that includes a plurality of electronic devices that are in electronic communication with one another via an Internet 102 connection. The cloud-based network 100 may include one or more networks 104 that are coupled to at least one administrative server 110 via the Internet 102.

The cloud-based network 100 may include one or more computer networks 104 such as a first network 104. The first network 104 may include one or more Local Area Networks (LANs), Wide Area Networks (WANs), Wireless Local Area Networks (WLANs), the Internet, etc. Each electronic device on the first network 104 may belong to an enterprise (e.g., a business, a university, a non-profit organization, a government agency, etc.). There are two different types of electronic devices in communication on the first network 104 shown in FIG. 1: a management server 106 and a node 108. There may also be one or more management servers 106 and one or more nodes 108 on one or more networks 104. The node 108 may be desktop computers, laptop computers, tablet computers, smartphones, printers, etc. The management server 106 may perform a variety of management-related operations with respect to the node 108. Examples of these management-related operations may include managing the node's 108 operating configurations, the node's 108 files, etc.

If the node 108 is a new electronic device that has recently joined the first network 104, the management server 106 may not be able to perform management-related functions with respect to the node 108. This inability to perform management-related functions may stem from the management server 106 not using an appropriate communication protocol or process with the node 108, or the node 108 may not be discovered or configured. In order for the management server 106 to perform management-related activities with respect to the node 108, the node 108 must be discovered and configured using a communication protocol or process acceptable by the node 108.

The cloud-based network 100 may also include an administrative server 110. The administrative server 110 may be in electronic communication with the electronic devices on the first network 104 via the Internet 102, in some cases using the management server 106 as an intermediary to an electronic device node 108 due to security or communication restrictions placed on the first network 104 by the operator of the first network 104. The administrative server 110 may perform a variety of management-related operations with respect to the electronic devices on the first network 104. Examples of management-related operations may include providing infrastructure services, node administration, etc. The administrative server 110 may be part of software-as-a-service (SaaS) or cloud-based architecture in which one or more tenants (e.g., customers, tenants, client-organizations) may independently operate a network 104 but may interface with the administrative server 110 for one or more services.

In one configuration, the cloud-based network 100 may be configured in a hybrid cloud-based solution. The hybrid cloud-based solution may include a configuration in which one or more management servers 106 may be physically located at an enterprise's premises, and the administrative server 110 may be implemented in a multi-tenant cloud-based architecture. The multi-tenant cloud-based architecture may be a cloud-based network 100 that enables one or more different tenants to access the administrative server 110 without interfering with one another's operations. The one or more tenants may be one or more different enterprises.

The administrative server 110 may manage both infrastructure and non-infrastructure devices. An infrastructure device may be a device that is connected solely to an enterprise's network (e.g., a printer, router, server, etc.). For example, a node 108 may be an infrastructure device, or a non-infrastructure device depending on the node's 108 use in the enterprise. A non-infrastructure device may be a device not solely connected to an enterprise's network, but may perform operations apart from the infrastructure (e.g., a laptop, smart phone, etc.). The cloud-based network 100 may rapidly discover and configure a new node, such as the node 108.

The administrative server 110 may include a management script 112 designed to discover and configure the node 108. The management script 112 may be computer instructions that enable a management server 106 to discover and configure the node 108. The management script 112 may be produced in one or more computer languages (e.g., JavaScript, C++, Python, etc.). The management script 112 may be authored by an administrator of the administrative server 110, a tenant administrator or user of the first network 104, a manufacturer of the node 108, etc.

The administrative server 110 may also include a testing module 114. The management script's 112 ability to discover and configure the node 108 may be tested using the testing module 114 on the administrative server 110. The testing module 114 may be accessible to the administrator of the administrative server 110 and any tenant administrator or user of the node 108. The testing module 114 may include the node's 108 internet protocol ("IP") address 116.

To determine if the management script 112 is effective at discovering and configuring the node 108, the administrative server 110 may send a management script 112 to the first management server 106 on the first network 104 for testing. The first management server 106 may execute the management script 112 in a test mode 118. The first management server 106 may generate management script test results 120 that document the output of the test mode 118 execution of the management script 112. The first management server 106 may send the management script test results 120 to the administrative server 110. Examples of the management script test results 120 may include the node's 108 identifying information (e.g. device name, serial number, etc.), the node's core parameters (e.g. media access control ("MAC") address, subnet mask, etc.), the node's configurations, etc.

The management script 112 may be tested in an iterative fashion. The iterative testing may include modifying the management script 112 to use various communication protocols to attempt to successfully discover and configure the node 108. Examples of communication protocols include simple network management protocol (SNMP), hypertext transfer protocol ("HTTP"), Telnet, etc. A more detailed description of this iterative process and functions of the management script 112 are discussed further below in relation to FIG. 3.

Upon completion of the management script 112 testing, a user may provide a user authorization 122 to the testing module 114. The user authorization 122 may enable an author of a management script 112 (e.g., an administrative server 110 administrator, a first network 104 administrator, a node 108 manufacturer, etc.) to authorize the public distribution of the management script 112. By authorizing public distribution of the management script 112 the author of the management script 112 may give the administrative server 110 permission to distribute the management script 112 to all networks connected to the administrative server 110. The networks 104 may or may not be operated by the enterprise with which the management script 112 author is affiliated.

The administrative server 110 may further include a validation module 124. The validation module 124 may itself receive an administrator validation 126. The validation module 124 may enable the administrative system 110 to receive an administrator validation 126 to distribute the management script 112. The validation module 124 may enable an administrator of the administrative server 110 to validate and authorize the distribution of the management script 112 to one or more management servers 106 on one or more networks 104. To authorize the distribution of the management script 112 to one or more management servers 106, an administrator may provide an administrator validation 126 to the validation module 124. By default the validated management script 112 may be automatically applied to each tenant; no tenant authorization is required.

Validating a management script 112 and distributing the script 112 to one or more networks 104 may enable the administrative server 110 to better manage nodes 108 on multiple networks 104 owned by one or more different enterprises. The validated management script 112 may be sent to one or more management servers 106 of an entire customer base. For example, the administrative system 110 may send the validated management script 112 to one or more management servers 106 on one or more networks 104 operated by one or more enterprises. Each management server 106 on each network 104 may continuously run in a discovery and configuration mode. Therefore, the management servers 106 may immediately execute the management script 112 to discover and configure a new device on any network 104, regardless of which enterprise is operating the network 104. As the management script 112 discovers and configures the node 108 using the node IP address 116, node identifiers and core parameters, the management servers 106 may also execute the management script 112 to discover and configure a new device on any network 104 regardless of the firmware version of the new device, reducing the number of scripts needed in the script inventory.

Prior to receiving the management script 112, a management server 106 may have detected an unmanageable or unknown node 108 for which it cannot obtain a signature and may have cached that node's 108 IP address. Upon receiving the management script 112, the management server 106 may attempt to immediately identify and discover the cached unknown nodes 108 (by using, for example, Retrieve Node Identifiers 332, as discussed in connection with FIG. 3, that are specified in the management script 112). If the management script 112 successfully identifies the node 108, it is discoverable and may also be configurable.

The systems and methods described may enable the cloud-based network 100 to operate more efficiently. Further, the systems and methods described may enable the management server 106 to perform more advanced management functions than current known methods, while also being easier and more time efficient. The systems and methods described may reduce the complexity of managing devices by using common scripting language. The common scripting language may be used to automate and hide common operations that dramatically reduce the size and complexity of code that must be authored. Finally, the systems and methods described may also make previously undiscoverable devices immediately and automatically discoverable and configurable.

Figure 2:
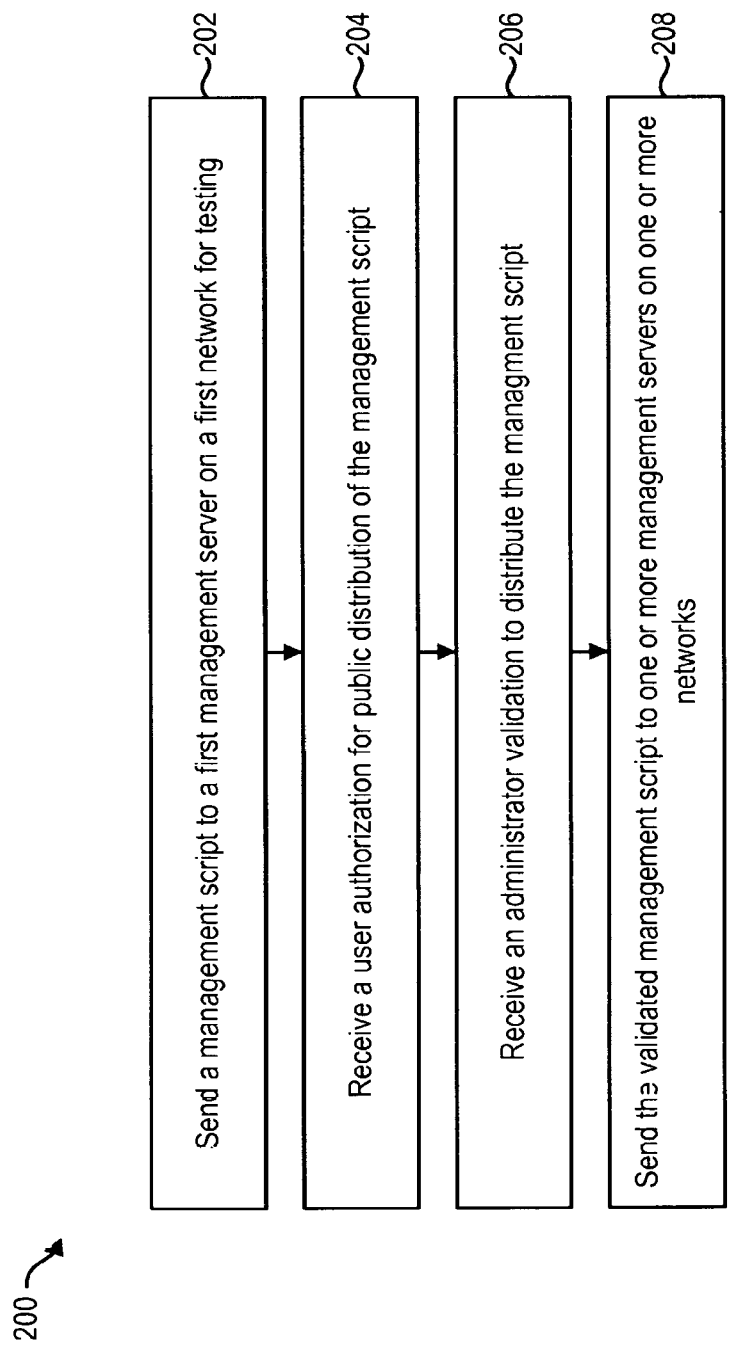
FIG. 2 is a flow diagram illustrating one configuration of a method of discovering and configuring nodes on one or more computer networks.

FIG. 2 is a flow diagram illustrating one configuration of a method 200 of discovering and configuring nodes 108 on one or more computer networks 104. The method 200 may be implemented by an administrative server 110. The administrative server 110 may be a computing device for managing nodes 108. The administrative server 110 may facilitate the rapid discovery and configuration of unmanaged nodes 108 on one or more networks 104.

When an unmanaged node 108 (e.g., electronic device) needs to be discovered and configured for operation on a first network 104, the administrator of the first network 104 may author a management script 112 designed to perform discovery and configuration functions. In order to test the management script 112 to determine if it will be effective, the administrative server 110 may test 202 the management script 112 on a management server 106 on the first network 104.

In one configuration, the administrative server 110 may receive an Internet Protocol address 116 for a node 108 on the first network 104. The IP address 116 may identify the node's 108 location on the first network 104. The IP address 116 may aid the management script 112 in discovering and configuring the node 108.

For instance, the IP address 116 may be received from an administrator of the first network 104. In one circumstance, the node 108 on the first network 104 may be a new device and may not have been discovered by the management server 106, but the IP address 116 is known by the first network's 104 administrator. In another circumstance, the node 108 on the first network 104 may have been discovered and its IP address 116 is known, but the node 108 has not yet been configured by the management server 106. In yet another circumstance, the node 108 may be discovered and partially configured by the management server 106, and its IP address 116 is known.

Testing 202 the management script 112 on the management server 106 of the first network 104 may also include sending the management script 112 to the management server 106. The management server 106 may process the management script 112 in a test mode 118 to discover and configure the node 108. The test mode 118 may include performing the operations coded in the management script 112. An example of the managements script operations are discussed below in relation to Listing 1.

Testing 202 the management script 112 on the management server 106 on the first network 104 may further include the administrative server 110 receiving management script test results 120 from the management server 106. For example, the management script test results 120 may include computer generated results (e.g., logs) generated by the management server 106 while performing the operations coded in the management script 112. The management script test results 120 may include information successfully gathered from the testing, or error codes for unsuccessful operations in the management script 112, etc.

The administrative server 110 may receive 204 user authorization 122 for public distribution of the management script 112. The user may be an author of the management script 112. For example, the user may be an administrative server 110 administrator, a first network 104 administrator, a node 108 manufacturer, etc. The user authorization 122 may provide the administrative server 110 with permission to distribute the management script 112 to other networks 104 in electronic communication with the administrative server 110. For instance, other networks 104 in electronic communication with the administrative server 110 may include an additional network 104 operated by the same enterprise operating the first network 104. Other networks 104 may also be networks 104 in electronic communication with the administrative server 110 that are not operated by the enterprise operating the first network 104.

In another scenario, the administrative server 110 may not receive 204 user authorization 122 for public distribution of the management script 112. For instance, the user may desire that the management script 112 be used solely on the user's network 104. In such a scenario, the management script 112 may be deployed only on the user's network 104 and not distributed to other management servers 106.

In one configuration, one or more networks 104 may be operated by one tenant (e.g., enterprise, client, customer, etc.) while other networks 104 may be operated by one or more other tenants. Therefore, the cloud-based network 100 may be a multi-tenant architecture.

In the scenario where the administrative server 110 receives user authorization 122, the administrative server 110 may receive 206 administrator validation 126 to distribute the management script 112. The administrator validation 126 may be received 206 after an administrator has verified the validity of the management script test results 120. In one scenario, the administrator may further modify the management script 112 prior to validating the management script 112 for deployment to the one or more networks 104. For example, the administrator of the administrative server 110 may add and or delete code from the management script 112 to better discover and configure a node 108 prior to validation.

The administrative server 110 may send 208 the validated management script 112 to one or more management servers 106 on one or more networks 104. For example, the administrative server 110 may send 208 the validated management script 112 to one or more management servers 106 of an entire customer base. One or more management servers 106 may use the management script 112 to discover nodes 108 similar or identical to the node 108 on their respective networks 104. For example, the one or more management servers 106 may apply the management script 112 by reading a known identifier of the unmanaged nodes 108. The degree of similarity for different node types may be configured within the management script 112.

As discussed above, one or more management servers 106 may be management servers 106 operated by one enterprise. One or more management servers 106 may additionally be management servers 106 operated by one or more enterprises. Further, the one or more networks 104 may be operated by one enterprise, or the one or more networks 104 may be operated by one or more enterprises, except that any single network 104 cannot be operated by more than one enterprise.

Figure 3:
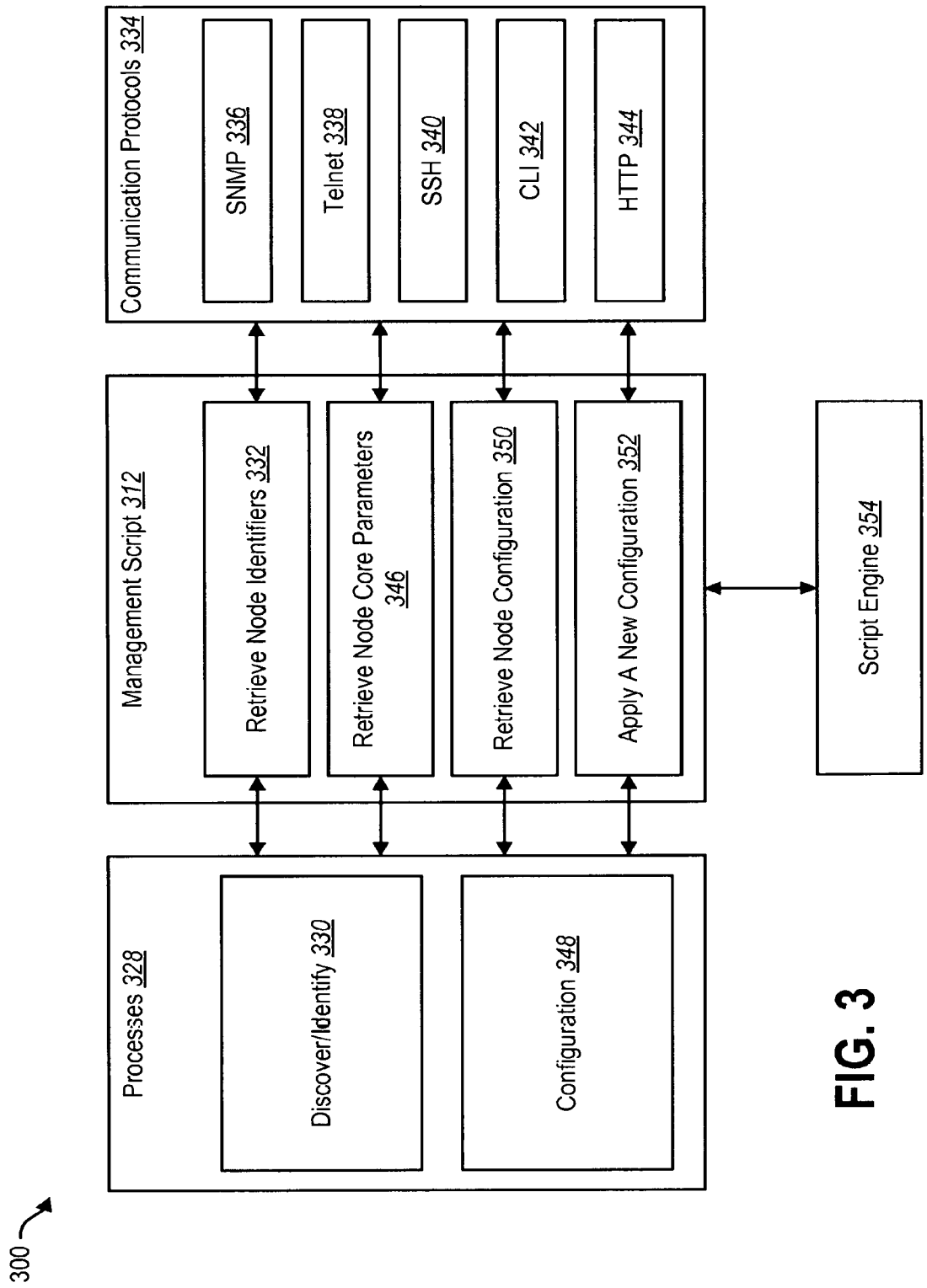
FIG. 3 is a block diagram illustrating one arrangement of operations that may be performed by a management script to discover and configure a node.

FIG. 3 is a block diagram illustrating one arrangement of operations 300 that may be performed by a management script 312 to discover and configure a node 108. The management script 312 may be written to perform certain processes 328. The first process which the management script 312 may be designed to perform is to discover and identify 330 a node 108. The first step in the discover and identify 330 process may be to retrieve node identifiers. Node identifiers may include characteristics of a node such as a node's manufacturer, model name, hardware version, software version, operating system version, series type, operating system type, original equipment manufacturer name, serial number, system language, role in the computer network, etc.

The management script 312 may include a retrieve node identifiers function 332. To retrieve the node identifiers, the management script 312 may use various communication protocols 334 to electronically communicate with a node. Further, the management script 312 may be written to iterate functions to retrieve node identifiers in various communication protocols 334. For example, the management script 312 may attempt to electronically communicate with a node to retrieve node identifiers using simple network management protocol (SNMP) 336. In the event that the management script 312 is unable to retrieve node identifiers using SNMP 336, the management script 312 may then attempt to retrieve node identifiers in an iterative process using Telnet 338, Secure Shell (SSH) 340, Command Line Interface (CLI) 342, or Hypertext Transfer Protocol (HTTP) 344 until the retrieve node identifier function 332 is successful at communicating with the node 108. It should be noted that the management script 312 may be configured to electronically communicate with the node 108 in other various communication protocols 334 not specifically referenced.

The management script 312 may also include a retrieve node core parameters function 346. A second step in the discover and identify 330 process may retrieve node core parameters using the iterative electronic communication process described above. Node core parameters may be useful for an administrator of a network to maintain an inventory of their electronic devices (i.e. keep a record of important qualities of each electronic device on the network). The retrieve node core parameters function 346 may be designed to retrieve all or some of the core parameters specified by the management script 312 author, and may store the core parameters in a dictionary for later reference. The retrieve node core parameters function 346 may also be designed to only retrieve certain core parameters. Specific examples of node core parameters include the node's media access control (MAC) address, user name, subnet mask, IP address, gateway address, device name, device location, etc.

The management script 312 may further include a retrieve node configuration function 350. The management script 312 may initiate a configuration process 348. After the discover and identify 330 process, it may be possible to configure a node 108 to the network administrator's preference. The network administrator may want to completely re-configure a node 108, so that the node 108 contains only a specific configuration. The network administrator may also want to only partially re-configure a node 108 so that the node's 108 configuration includes only some administrator preferences while retaining some manufacturer preferences.

A first step in the configuration process 348 may be to retrieve a node configuration. In one configuration, a retrieve node configuration function 350 may be designed to obtain the entire configuration file from a node 108. In another configuration, the retrieve node configuration function 350 may be designed only to obtain portions of the configuration file of a node 108. In yet another configuration, the retrieve node configuration function 350 may be designed to permanently remove the configuration file from a node 108. Also, the retrieve node configuration function 350 may be designed only to permanently remove a portion of the configuration file from a node 108.

The management script 312 may also include an apply a new configuration function 352. After the configuration file has been retrieved from a node 108, a new configuration may be applied to a node 108. Applying a new configuration to a node 108 may include sending an entirely new configuration file to a node 108. The new configuration file may be specifically designed to include configurations specified by an administrator. Further, applying a new configuration to a node 108 may also include sending a configuration file to merge with an existing configuration file on a node 108. Merging the new configuration file with the existing configuration file may alter only a few specified configuration settings. After the new configuration is applied, the discovery and identify 330 process and configuration 348 process are complete.

The script engine 354 may process the management script 312 to perform the above listed functions. The management script 312 may be processed by the script engine 354 on a management server 106. A management server 106 may use the script engine 354 to process the management script 312 in a test mode 118, or it may use the script engine 354 to process the management script 312 not in the test mode 118. The script engine 354 may process the management script 312 on one or more management servers 106, and on one or more networks 104. As noted above, the one or more management servers 106 and one or more networks 104 may be operated by one or more enterprises as part of a multi-tenant cloud-based architecture. Following the discover and identify 330 process and configuration 348 processes, a node 108 may be managed by a management server 106 on a network 104.

The management script 112 may also enable other operations. For instance, once a management script 112 retrieves node identifiers from a node 108, it may be possible to match those node identifiers to node identifiers in a pre-existing management script 112. In another example, the management script 112 may be generated based on a stepwise method of retrieving specific node identifiers and node core parameters.

One example of a management script 112 is illustrated below in Listing 1.

Listing 1

```
function register_ident_methods( )
{
return ["sysDescr"];
}
```

---
Listing 1
---

```
function identify_from_sysdescr (sysDescr)
{
    var result = { };
    //AP6521 Access Point, Version 5.3.1.0-009R MIB=01a
    var patt = / (AP6521) Access Point, Version ([\w\.\d\-]+)/
    var matchedResults = patt.exec(sysDescri) ;
    if (matchedResults)
    {
    result [ "manufacturer"] = "Motorola" ;
    result ["model"] = matchedResults[1] ;
    result ["version"] = matchedResults[2] ;
    result ["role"] = "AccessPoint" ;
    result ["errorCode"] = 0 ;
    }
    else
    {
        result ["errorCode"] = 1 ;
        result ["errorMsg"] = "Unable to match sysDescr:" + sysDescr ;
    }
    return result ;
}
function identify_from_device(ctx)
{
    return undefined ;
}
function get_core_settings(ctx) {
    var dict = { } ;
    // Returns [mac], [mask]
    dict = ctx.snmpGetIfTableItems ( ) ;
    if (dict["errorCode"] != undefined)
        return dict;// error occurred, no need to go further
    ctx.snmpGet(dict, "1.3.6.1.2.1.1.5.0", "name") ;
    if (dic["errorCode"] != undefined)
        return dict;// error occurred, no need to go further
    return dict;
}
    function apply_config_file(ctx, ftp, filename)
{
    ctx.telnetLogin ( ) ;
    ctx.telnetSendAndExpect ("copy ftp://admin:admin@" + ftp + "/" + filename +
    "system:running-config\n", "#", 20000, true) ;
    ctx.telnetSendAndExpect ("write mem\n", "#", 10000, true) ;
    return true ;
}
//
// Copy the device's running config file onto the ftp server
//
function pull_config_file(ctx, ftp, filename)
{
    ctx.telnetLogin ( ) ;
    ctx.telnetSendAndExpect ("copy system:running-config ftp://admin:admin@" + ftp +
    "/"
    + filename +"\n", "#" 20000, true) ;
    return true;
}
```

A specific example of retrieving node identifiers 332 is demonstrated in Listing 1. In Listing 1, the function "register_ident_methods" may be a means to inform the management script 112 author what types of identification approaches are supported by a node 108. The function "register_ident_methods" may inform the management script 112 author that "sysDescr" is the identification approach to be used. The function "identify_from_sysdescr (sysdescr)" may be a means to identify a node 108 using the identification approach "sysDescr". "Var patt" may be a regular expression used to identify a specific node 108, and extract node identifiers from it. The "result[" manufacturer"]", "result[" model"]", "result[" version"]", and result["role"]" are examples of some node identifiers that may be returned in the form of a dictionary followingthe "var patt" expression. The function "identify_from_de vice(ctx)" may be a custom method to further identify a node 108.

A specific example of the retrieving node core parameters function 346 is illustrated in Listing 1. The function "get_core_settings(ctx)" may be a means for the management script 112 author to retrieve core parameters of a node 108. The "ctx.snmpGetIfTableItems" portion of the management script 112 may be a method to call back to the management server 106 to retrieve the MAC address and subnet mask of a node 108. The "ctx.snmpGet(dict, "1.3.6.1.2.1.1.5.0", "name")" may be a method of directly using SNMP to retrieve the name of a node 108. This method may also be iterated in many other communication protocols until it successfully retrieves the core parameters of a node 108 as described above.

Detailed examples of one configuration of the retrieve node configuration function 350 and apply a new configuration function 352 are illustrated in Listing 1. The function "apply_config_file(ctx, ftp, filename)" and "pull_config_file (ctx, ftp, filename)" may be specific methods of applying and retrieving configuration files on a node 108, respectively. These apply and retrieve functions may further include "ctx.telnet . . . " functions that may send a command line interface command and wait for an expected response in order to accomplish the apply and retrieve functions. The "ctx" parameter, in the "apply_config_file(ctx, ftp, filename)" and "pull_config_file(ctx, ftp, filename)" functions is the "context" which allows for a callback into a management server 106 to perform useful operations. FTP is a means of designated a file transfer protocol to be used in the functions. Other file transfer protocols may be used such as secure file transfer protocol (SFTP), trivial file transfer protocol (TFTP), etc.

Figure 4:
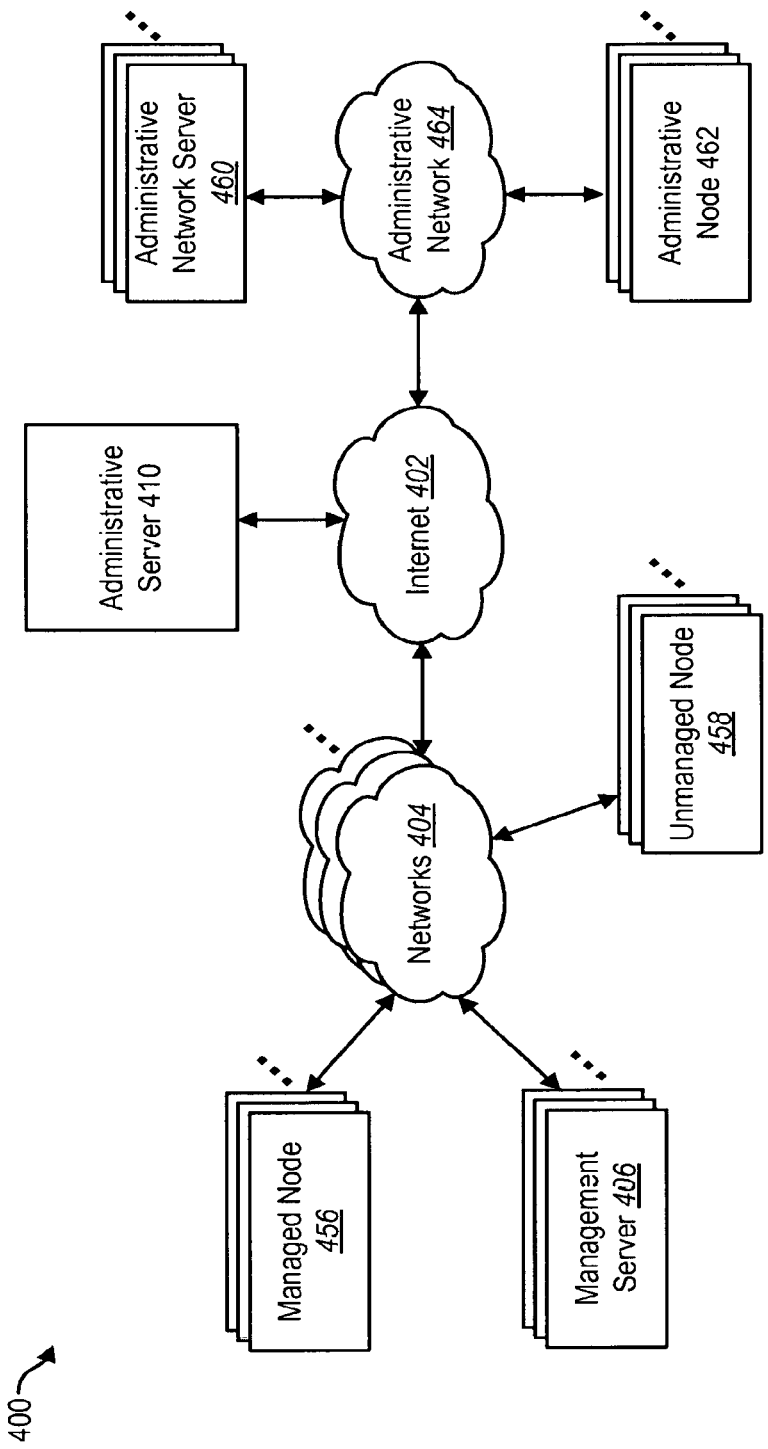
FIG. 4 illustrates another configuration of a cloud-based network in which discovering and configuring new electronic devices on a computer network may be implemented.

FIG. 4 illustrates another configuration of a cloud-based network 400 in which discovering and configuring new electronic devices on a computer network 404 may be implemented. The cloud-based network 400 may have a plurality of management servers 406, a plurality of managed nodes 456 and a plurality of unmanaged nodes 458 that are connected to a plurality of networks 404. The cloud-based network 400 may include a plurality of administrative network servers 460 and a plurality of administrative nodes 462 that are connected to an administrative network 464. The one or more networks 404, and the corresponding managed nodes 456, unmanaged nodes 458 and management servers 406 on each network 404 may all be owned and operated by one enterprise. The one or more networks 404, and the corresponding managed nodes 456, unmanaged nodes 458 and management servers 406 on each network 404, may additionally be owned and operated by one or more different enterprises. The one or more networks 404 and the administrative network 464 are connected to the Internet 402. An administrative server 410 that is also connected to the Internet 402 may facilitate operations described herein.

Figure 5:
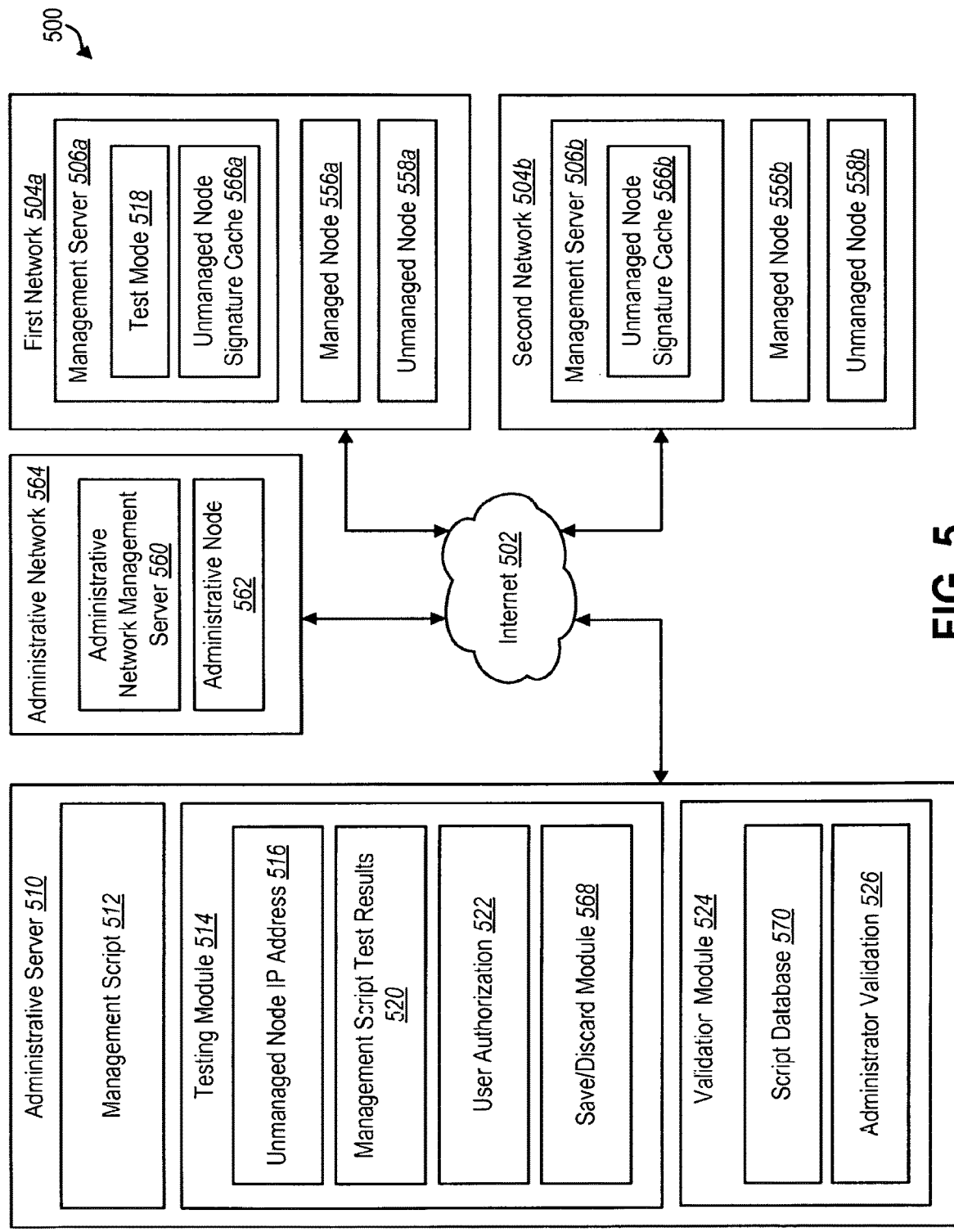
FIG. 5 illustrates another more detailed configuration of a cloud-based network in which discovering and configuring new electronic devices on a computer network may be implemented.

FIG. 5 illustrates another more detailed configuration of a cloud-based network 500 in which discovering and configuring new electronic devices on a computer network may be implemented. The cloud-based network 500 may include a plurality of electronic devices that are in electronic communication with one another via an Internet connection 502. The cloud-based network 500 may be similar to the cloud-based network 100 described in connection with FIG. 1. The cloud-based network 500 may include the administrative server 510 introduced above. The administrative server 510 may be similar to the administrative server 110 described in connection with FIG. 1. The cloud-based network 500 may include a first network 504a. The first network 504a may be similar to the first network 104 described in connection with FIG. 1.

The first network 504a may include a managed node 556a, an unmanaged node 558a and a management server 506a. The managed node 556a and unmanaged node 558a may be desktop computers, laptop computers, tablet computers, smartphones, printers, etc. The management server 506a may perform a variety of management-related operations with respect to the managed node 556a. The management server 506a may not yet perform a variety of management-related operations with respect to the unmanaged node 558a, as the unmanaged node 558a may not yet have been discovered, identified, and/or configured by the management server 506a in a manner similar to the processes 328 described in connection with FIG. 3.

The cloud-based network 500 may include a second network 504b. In a manner similar to the first network 504, the second network 504b may include a managed node 556b, an unmanaged node 558b and a management server 506b. The managed nodes 556a-b, unmanaged nodes 558a-b, and management servers 506a-b may have equivalent components in the first network 504a and the second network 504b, and may perform the same or similar functions.

The cloud-based network 500 may include an administrative network 564. The administrative network 564 may belong to an enterprise that operates the administrative server 510. The administrative network 564 may include an administrative network management server 560 and an administrative node 562. The administrative network management server 560 may perform management functions related to the administrative node 562. The administrative node 562 may be similar to the managed nodes 556a-b, and may enable an administrator to electronically communicate with the administrative server 510 via the administrative network's 564 Internet 502 connection.

The one or more networks 504 may be operated by one or more enterprises. The one or more enterprises may both access the cloud-based network 500 without interference or interfering with the access of other enterprises. This enables multiple tenants to simultaneously access the cloud-based network 500, making it a multi-tenant cloud architecture.

The cloud-based network 500 may further include the administrative server 510. The administrative server 510 may include a management script 512 designed to discover and configure the unmanaged nodes 558a-b. In a similar manner to the management script 112 described in connection with FIG. 1, the management script 512 may be computer instructions that enable the management servers 506a-b to discover and configure the unmanaged nodes 558a-b. The management script's 512 computer language may be JavaScript, C++, Python, etc. The management script 512 may be authored by an administrator of the administrative server 510, an administrator of the first network 504, a manufacturer of the unmanaged nodes 556a-b, etc.

The management script's 512 ability to discover and configure the unmanaged nodes 558a-b may be tested using a testing module 514 on the administrative server 510. For example, a testing module 514 may include an unmanaged node IP address 516. For instance, the unmanaged node IP address 516 may correspond to an unmanaged node 558a in the first network 504a. To determine the efficacy at discovering and configuring the unmanaged node 558a, the administrative server 510 may send the management script 512 and the unmanaged node IP address 516 to the management server 506a on the first network 504a to execute in a test mode 518. The test mode 518 execution of the management script 512 may include performing the operations of the management script 512.

The testing module 514 may include management script test results 520 that document the output of the execution of the management script 512 in test mode 518. The output of the execution of the management script 512 in test mode 518 may include information successfully retrieved from the managed node 556a, or error codes associated with unsuccessful operations.

The testing module 514 may also receive a user authorization 522. The user authorization 522 may indicate that an author of the management script 512 (i.e. the administrative server 510 administrator, the first network 504 administrator using the managed node 556a on the first network 504a, the unmanaged node 558a manufacturer, etc.) authorizes public distribution of the management script 512. The testing module 514 may further include a save/discard module 568. The save/discard module 568 on the administrative server 510 may enable the author of the management script 512 to save and or discard the management script 512.

The administrative server 510 may further include a validation module 524. The validation module 524 may include a script database 570. The script database 570 may display user authorized management scripts 512 pending administrator validation for distribution. The validation module 524 may further include an administrator validation 526 where an administrator using the administrative node 562 may validate the management script 512 in the script database 570, and authorize the management script's 512 distribution to one or more management servers 506a-b on one or more networks 504a-b.

Validating a management script 512 and distributing the script to one or more networks 504a-b may enable the administrative server 510 to better manage nodes on multiple networks 504 owned by one or more different enterprises. For example, the administrative system 510 may send the validated management script 512 to one or more management servers 506 on one or more networks 504 operated by one or more enterprises.

Because each management server 506 on each network 504 is continuously running in a discovery and configuration mode, the management script 512 may immediately discover and configure a new device. In one configuration, the management servers 506a-b may include unmanaged node signature caches 566a-b. When a management server 506 interacts with an unmanaged node 558, the management server 506 may save a signature of the unmanaged node 558 in the unmanaged node signature cache 566.

A signature of the unmanaged node 558 may be a collection of identifiers obtained from the device by using all available protocols, an unambiguous identifier for a type of device that is obtained by collecting identifiers from the device by using all available protocols, etc. The unmanaged node 566 signature may be the result of the retrieve node identifiers 332 operation discussed in connection with FIG. 3. Upon receiving a validated management script 512, the management servers 506a-b may process the signatures saved in the unmanaged node signature cache 566a-b with the management script 512. Alternatively, the management server 106 may choose to ignore the contents of the cache and attempt to run the discover and identify 330 procedure and configuration 348 procedures, discussed in connection with FIG. 3, of the management script 512 against the unmanaged node 558. Therefore, the previously unmanaged nodes 558 may immediately become managed nodes 556 upon executing the management script 512. The previously unmanaged nodes 558 may immediately become managed nodes 556 upon executing the management script 512 regardless of what firmware version is installed on the previously unmanaged node 558. Processing the unmanaged node signature cache 566 may occur on any network regardless of which enterprise is operating the network 504.

Figure 6:
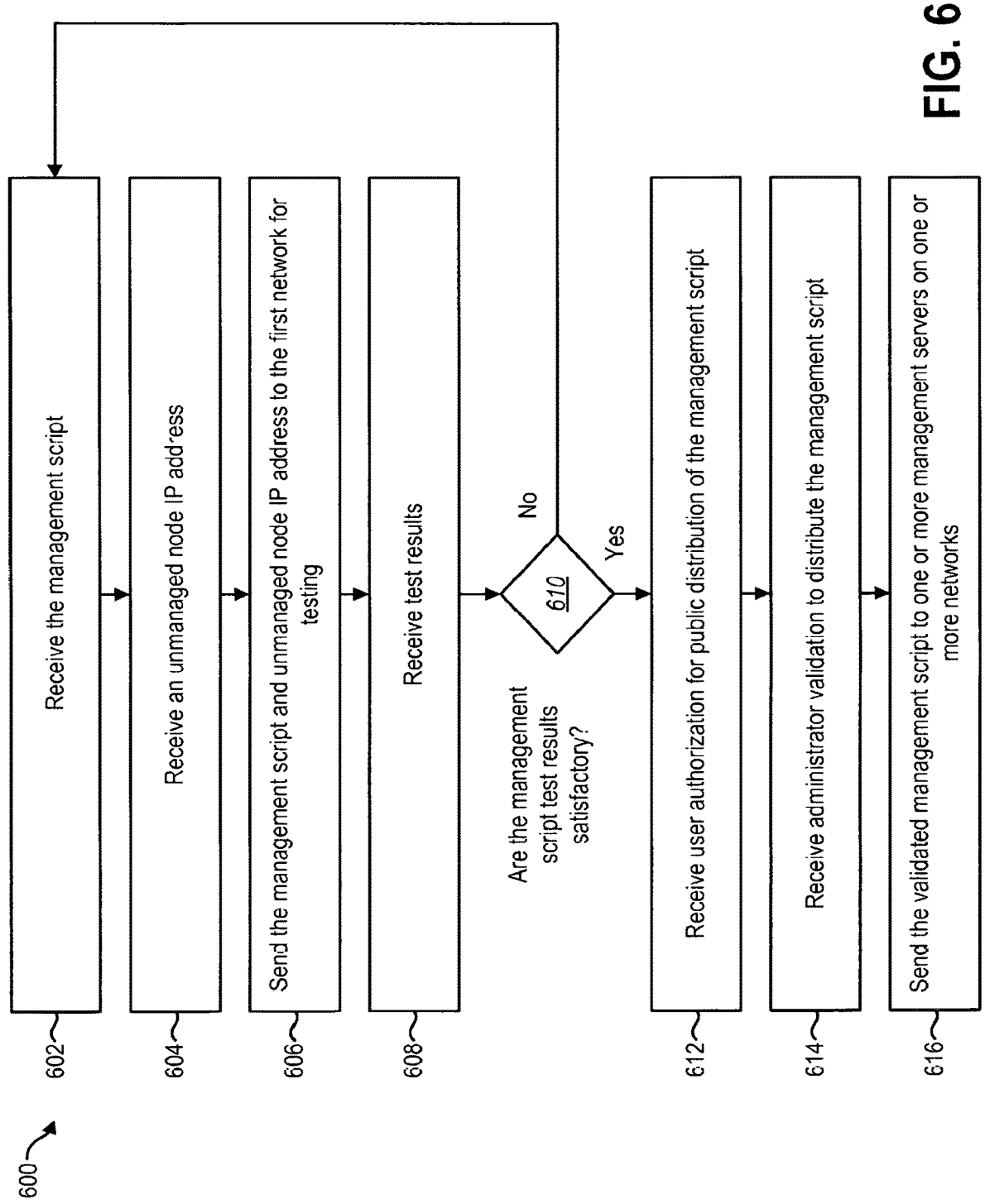
FIG. 6 is a flow diagram illustrating a more detailed configuration of a method for discovering and managing unmanaged nodes.

FIG. 6 is flow diagram illustrating a more detailed configuration of a method 600 for discovering and managing unmanaged nodes 558. The method 600 may be performed by an administrative server 510 that may facilitate the rapid discovery and configuration of new electronic devices on one or more computer networks 504. The administrative server 510 may receive 602 a management script 512. The administrative server 510 may receive 602 the management script 512 from a plurality of sources. For example, the administrative server 510 may receive 602 the management script 512 from an administrator operating the managed node 556a on the first network 504a. The administrative server 510 may also receive 602 the management script 512 from an administrator operating the administrative node 562 on the administrative network 564.

The administrative server 510 may receive 604 an unmanaged node IP address 516. As described above, the administrative server 510 may receive 604 an IP address of the unmanaged node 558a from a plurality of sources, such as an administrator operating the managed node 556a on the first network 504a, or an administrator operating the administrative node 562 on the administrative network 564.

The administrative server 510 may receive 604 an unmanaged node Internet Protocol address 516. The unmanaged node IP address 516 identifies the unmanaged node's 558 location on a network 504. As an example, an unmanaged node 558a on the first network 504a may not have been discovered by the management server 506a, but the unmanaged node IP address 516 is known by the first network's 504a administrator. In another circumstance, the managed node 558a on the first network 504a may have been discovered and its IP address is known, but the managed node 558a has not yet been configured by the management server 506a. In yet another circumstance, the managed node 558a may be discovered and partially configured by the management server 506a, and its IP address is known.

The administrative server 510 may send 606 the management script 512 and the unmanaged node's IP address 516 to the management server 506a on the first network 504a for testing. The testing performed by the management server 506a on the first network 504 may also include receiving the management script 512 from the administrative server 510, wherein the management server 506a processes the management script 512 in a test mode 518 to discover and configure the unmanaged node 558a.

The administrative server 510 may receive 608 test results from the management server's 506a test mode 518 processing of the management script 512. The management script test results 520 may be reviewed by an author of the management script 512 to validate that the management script test results 520 are 610 satisfactory. If the management script test results 520 are not satisfactory, the user may author changes to the management script 512. Following the alteration, the administrative server 510 may again receive 602 the management script 512 and repeat testing of the management script 512.

If the management script test results 520 are satisfactory, the administrative server 510 may receive 612 user authorization 522 for public distribution of the management script 512. Examples of receiving 612 user authorization may include the user selecting a button on an interface granting permission for distribution, the user agreeing to a distribution agreement, etc. The user may also save/discard 574 the management script 512 on the administrative server 510.

In another scenario, the administrative server 510 may not receive 612 user authorization 522 for public distribution of the management script 512. For example, the user may desire that the management script 112 be used solely on the user's network 104, and the user may not select a button on the interface granting permission for distribution or may not agree to a distribution agreement, etc. In such a scenario, the management script 512 may be deployed only on the user's network 504 and not distributed to other management servers 506.

In the scenario where the administrative server 510 receives 612 user authorization 522 for public distribution of the management script 512, the management script 512 may be kept in a script database 570.

The administrative server 510 may receive 614 administrator validation 526 to distribute the management script 512. For example, after the administrator reviews the management script 512 in the script database 576, the administrator may provide administrator validation 526 to distribute the management script 512.

The administrative system 510 may send 616 the validated management script 512 to one or more management servers 506 on one or more networks 504. For example, the management script 512 may be sent to the management server 506a on the first network 504a, and the management server 506b on the second network 504b. The management server 506 may process the management script 512 to discover one or more unmanaged nodes 558 by applying the management script 512 to unmanaged node 558b signatures stored in the unmanaged node signature cache 566b. The management script 512 may then discover unmanaged nodes 558 that connect to the network 504 so that they may become managed nodes 556. The management servers 506 may discover and configure unmanaged nodes 558 by either an automatic continuously running discovery and configuration mode, or manually by an administrator.

Figure 7:
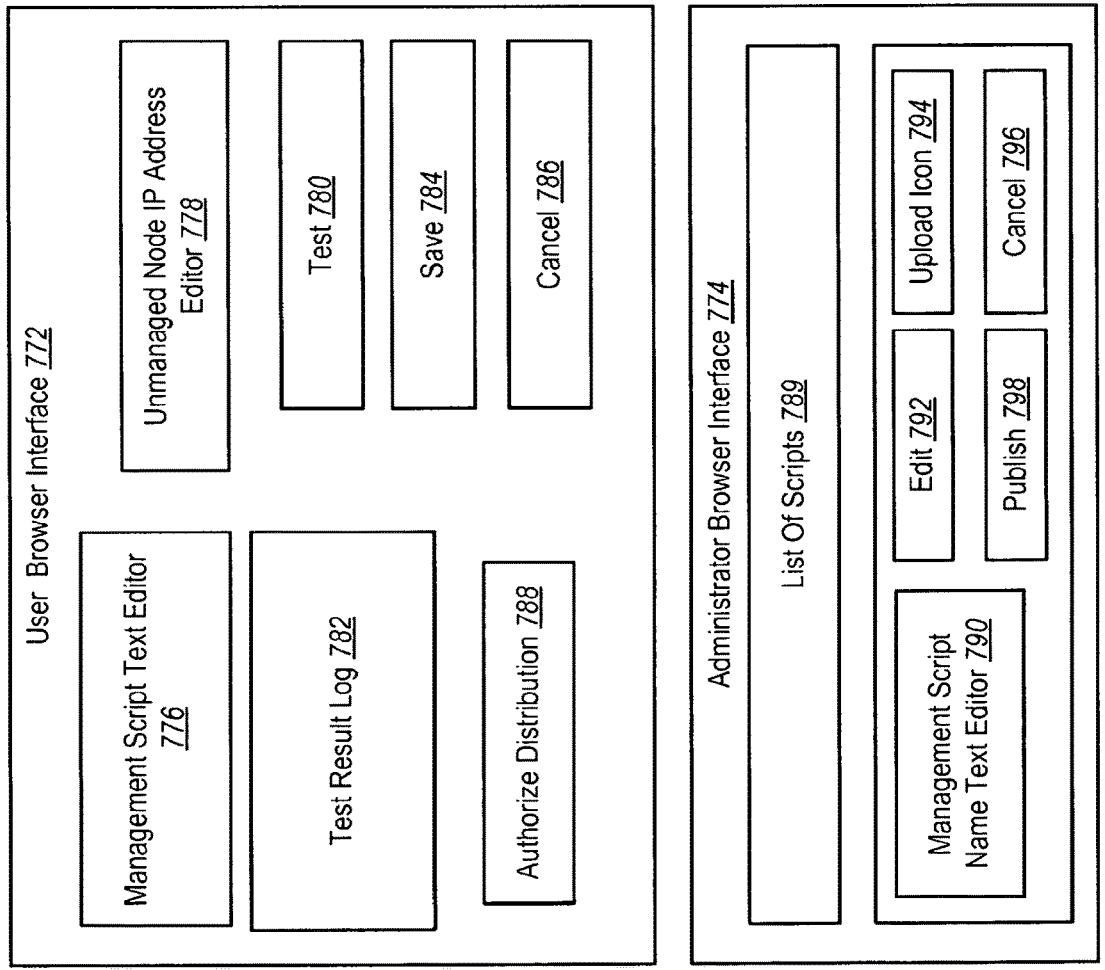
FIG. 7 illustrates one configuration of a browser interface that may be used in the rapid discovery and configuration of new electronic devices on one or more computer networks.

FIG. 7 illustrates one configuration of a browser interface 700 that may be used in the rapid discovery and configuration of new electronic devices on one or more computer networks. The browser interface 700 may include a user browser interface 772 and an administrator browser interface 774. The user browser interface 772 may provide a user with a set of controls for interacting with the administrative server 510.

The user browser interface 772 may be accessed by a user to add support for an unmanaged node 558 on a network 504 in electronic communication with the administrative server 510. The user browser interface 772 may also be accessed by a user operating the managed node 556b on the second network 504 in electronic communication with the administrative server 510 via the Internet 502. The user may also be operating one or more other managed nodes 556 on one or more other networks 504 not specified that are in electronic communication with the administrative server 510.

The user browser interface 772 may include a management script text editor 776. The management script text editor 776 may enable a user to author a management script 512. The user browser interface 772 may also include an unmanaged node IP address editor 778. The unmanaged node IP address editor 778 may enable a user to enter the IP address 516 of the unmanaged node 558 on a network 504.

The user browser interface 772 may further include a test button 780 the management script 512 entered into the management script text editor 776. The test button 780 may send a management script 512 entered into the management script text editor 776 and the unmanaged node IP address 516 entered into the unmanaged node IP address editor 778 to a network 504 for testing.

Results of the testing may be received by the administrative server 510 and populated in a test result log 782 on the user browser interface 772. The test result log 782 may enable the author of the management script 512 to determine if the test results are satisfactory.

The user browser interface 772 may include a save button 784 that enables the user to save the test results in the test results log 782 and/or the management script 512 entered into the management script text editor 776. Alternatively, a cancel button 786 may enable the user to cancel and discard the test results in the test results log 782 and or the management script 512 entered into the management script text editor 776.

The user browser interface 772 may further include an authorize distribution button 788. The authorize distribution button 788 may enable the administrative server 510 to receive user authorization for public distribution of the management script 512 entered into the management script text editor 776.

The browser interface 700 may further include an administrator browser interface 774. The administrator browser interface 774 may provide an administrator with a set of controls for interacting with the administrative server 510. The administrator browser interface 774 may be accessed by an administrator operating the administrator node 562 on the administrative network 564 in electronic communication with the administrative server 510 via the Internet 502. The administrator browser interface 774 may also be accessed by an administrator directly from the administrative server 510.

The administrator browser interface 774 may include a window illustrating a list of scripts 789. The list of scripts 789 may enable an administrator to review management scripts 512 that users have authorized the administrator to distribute. The administrator browser interface 774 may also include a management script name text editor 790. The management script name text editor 790 may enable the administrator to rename or alter portions of the management script 512 name prior to distribution.

The administrator browser interface 774 may also include an edit button 792 which may enable the administrator to edit the management script 512. There may additionally be an upload icon button 794 which may enable the administrator to attach an icon to describe the management script 512. The administrator browser interface 774 may include a cancel button 796 that may enable the administrator to cancel or disallow distribution of the management script 512.

The administrator browser interface 774 may also include a publish button 798. The publish button 798 may enable the administrator of the administrative server 510 to enter an administrator validation 526 to distribute the management script 512. The administrative server 510 may then send the validated management script 512 to one or more management servers 506 on one or more networks 504.

Figure 8:
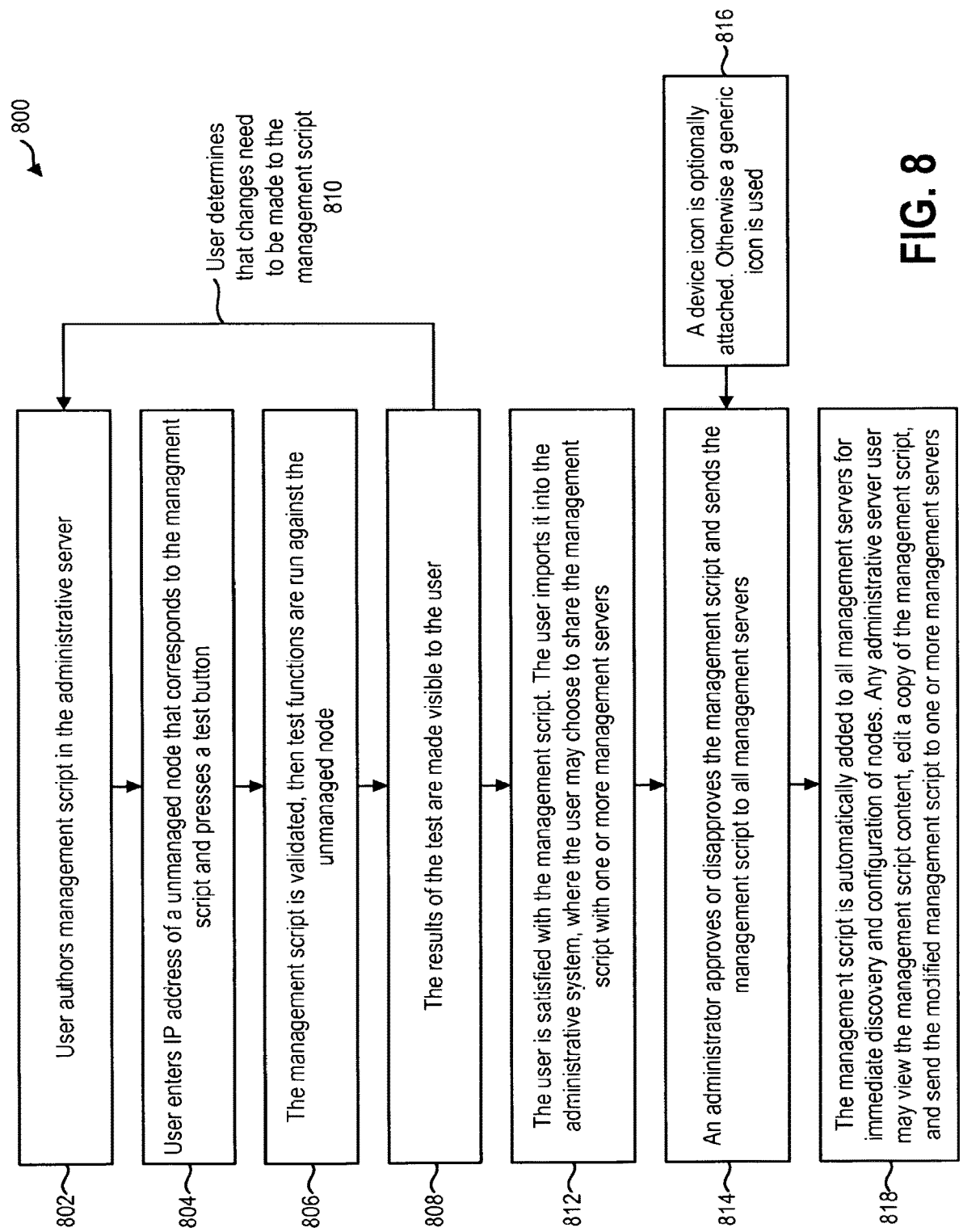
FIG. 8 is a flow diagram illustrating another detailed configuration of a method for discovering and managing unmanaged nodes.

FIG. 8 is a flow diagram illustrating another detailed configuration of a method 800 for discovering and managing unmanaged nodes 558. A user may author 802 a management script 512 in the administrative server 510 via the management script text editor 776 on the user browser interface 772. The user may further enter 804 the IP address 516 of an unmanaged node 558a corresponding to the management script 512 and may press the test button 780. The Administrative server 510 sends the management script 512 to the management server 506a to execute the management script 512 in a test mode 518 where the management script 512 is validated 806 and test functions are run against the managed node 558a The results of the test are made visible 808 to the user via the test results log 782 on the user browser interface 772. If the user determines 810 that changes need to be made to the management script 512, the user may return and author 802 the management script 512 in the administrative server 510 via the management script text editor 776 on the user browser interface 772. If the user is satisfied 812 with the management script 512, the user may import the management script 512 into the administrative system 510 by clicking the save button 784 on the user browser interface 772. The user may choose to share the management script 512 with one or more management servers 506 by selecting the authorize distribution button 788 on the user browser interface 772.

An administrator may approve 814 or disapprove the management script 512 by selecting the publish button 798 or the cancel button 796 respectively. The administrator may send the management script 512 to all management servers 506. A device icon may optionally be attached 816 by selecting the upload icon button 794. Otherwise a generic icon may be used.

The management script 512 may then be automatically added 818 to all management servers 506 for immediate discovery and configuration of unmanaged nodes 558. In a multi-tenant environment, a tenant 1129a-n administrative user may choose to accept or reject an approved management script 1112 before it is sent to the tenant management server 1106a-n. Any administrative server 510 user may view the management script 512 content, edit a copy of the management script 512, and send the modified management script 512 to one or more management servers 506. For example, administrative server 510 users may include an administrative server 510 administrator, a first network 504 administrator, a node 508 manufacturer, etc.

Figure 9:
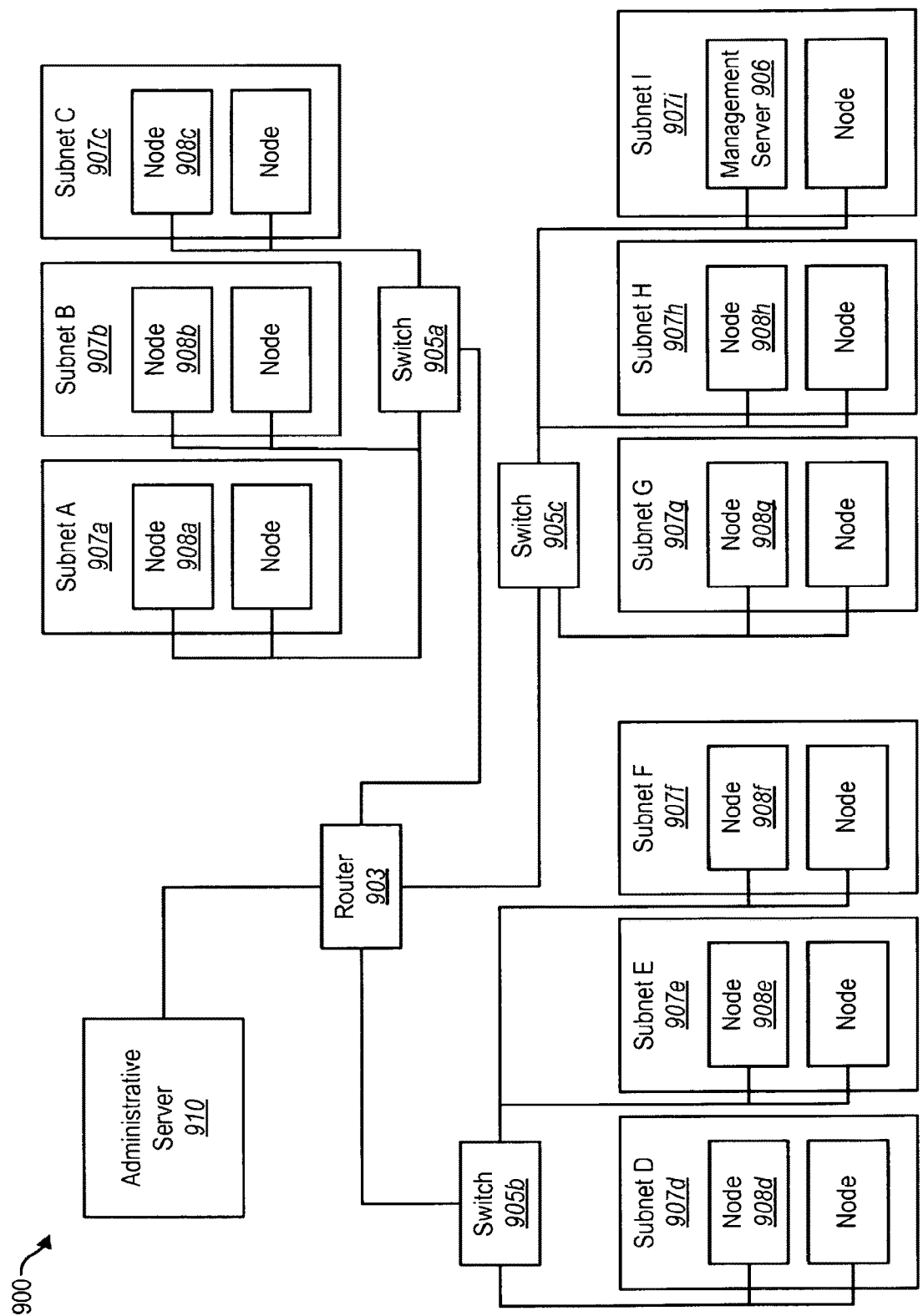
FIG. 9 is a block diagram that illustrates one configuration of a network where systems and methods for network management may be implemented.

FIG. 9 is a block diagram that illustrates one configuration of a network 900 where systems and methods for network management may be implemented. An administrative server 910 is connected to a router 903. The router 903 is connected to switches 905a, 905b, 905c. The switch 905a is connected to several nodes 908a, 908b, 908c, etc., via their respective subnets 907a, 907b, 907c. The switch 905b is connected to several nodes 908d, 908e, 908f, etc., via their respective subnets 907d, 907e, 907f. The switch 905c is connected to a management server 906 and several nodes 908g, 908h, etc., via their respective subnets 907g, 907h, 907i. Although FIG. 9 only shows one router 903, and a limited number of switches 905, subnets 907, management server 906 and nodes 908, many and varied numbers of routers 903, switches 905, subnets 907, management servers 906 and nodes 908 may be included in networks and/or systems that may implement systems and methods for network management. It should be noted that one or more of the nodes 908a-h may be examples of one or more of the nodes 108 and 462, managed nodes 456 and 556, and unmanaged nodes 458 and 558 described herein. Additionally or alternatively, the administrative server 910 may be one example of one or more of the administrative servers 110, 410 and 510 described herein, except insofar as any given subnet 907a-i cannot be accessed by more than one enterprise.

Figure 10:
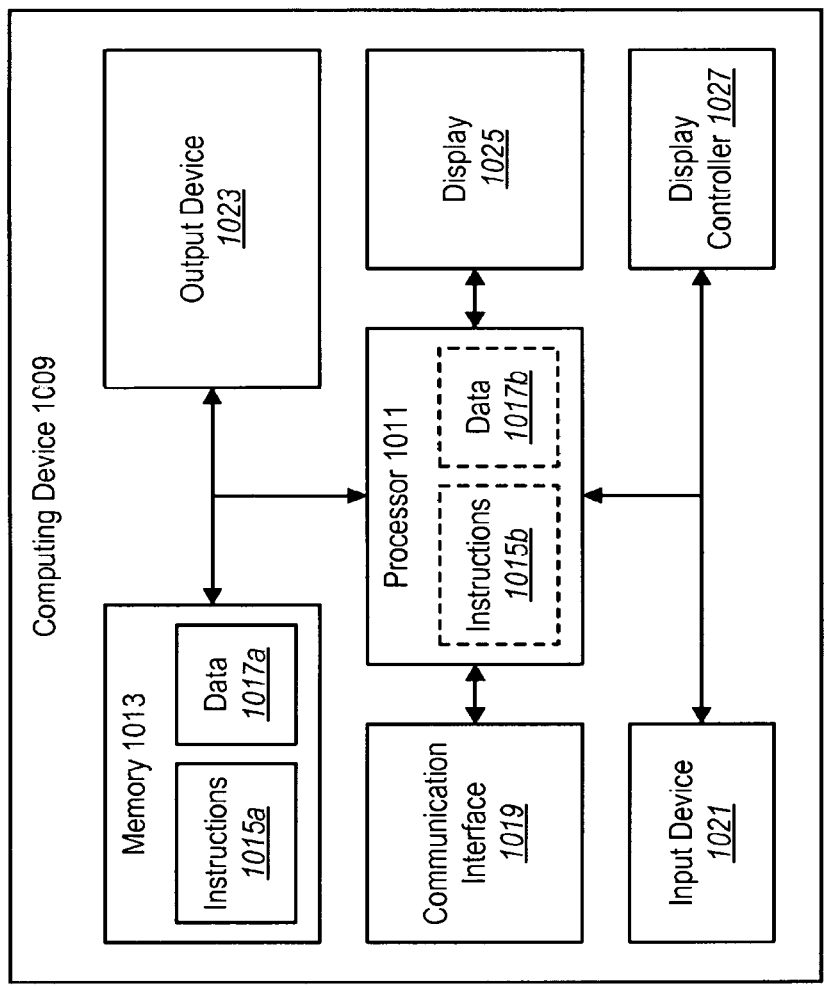
FIG. 10 illustrates various components that may be utilized in a computing device.

FIG. 10 illustrates various components that may be utilized in a computing device 1009. The computing device 1009 may be configured in accordance with one or more of the administrative servers 110, 410 and 510, management servers 106, 406 and 506a-b, and nodes 108, 456, 458, 462, 556, 558, 562, 1108 described herein. The computing device 1009 may include a processor 1011 and memory 1013. The memory 1013 may include instructions 1015a and data 1017a. The processor 1011 controls the operation of the computing device 1009 and may be, for example, a microprocessor, a microcontroller, a digital signal processor (DSP) or other device known in the art. The processor 1011 typically performs logical and arithmetic operations based on program instructions 1015b and/or data 1017b received from the memory 1013.

The computing device 1009 typically may include one or more communication interfaces 1019 for communicating with other electronic devices. The communication interfaces 1019 may be based on wired communication technology, wireless communication technology or both. Examples of different types of communication interfaces 1019 include a serial port, a parallel port, a Universal Serial Bus (USB), an Ethernet adapter, an IEEE 950 bus interface, a small computer system interface (SCSI) bus interface, an infrared (IR) communication port, a Bluetooth wireless communication adapter, and IEEE 802.11 wireless Ethernet extender commonly known as WiFi and so forth.

The computing device 1009 typically may include one or more input devices 1021 and one or more output devices 1023. Examples of different kinds of input devices 1021 include a keyboard, mouse, microphone, remote control device, button, joystick, trackball, touchpad, lightpen, etc. Examples of different kinds of output devices 1023 include a speaker, printer, etc. One specific type of output device that may be included in a computer system is a display device 1025. Display devices 1025 used with configurations disclosed herein may utilize any suitable image projection technology, such as liquid crystal display (LCD), light-emitting diode (LED), gas plasma, electroluminescence, a cathode ray tube (CRT) or the like.

A display controller 1027 may also be provided, for converting data stored in the memory 1013 into text, graphics and/or moving images (as appropriate) shown on the display device 1025. Of course, FIG. 10 illustrates only one possible configuration of a computing device 1009. Various other architectures and components may be utilized. For example, the display controller 1027 may be directly coupled to the memory 1013.

Figure 11:
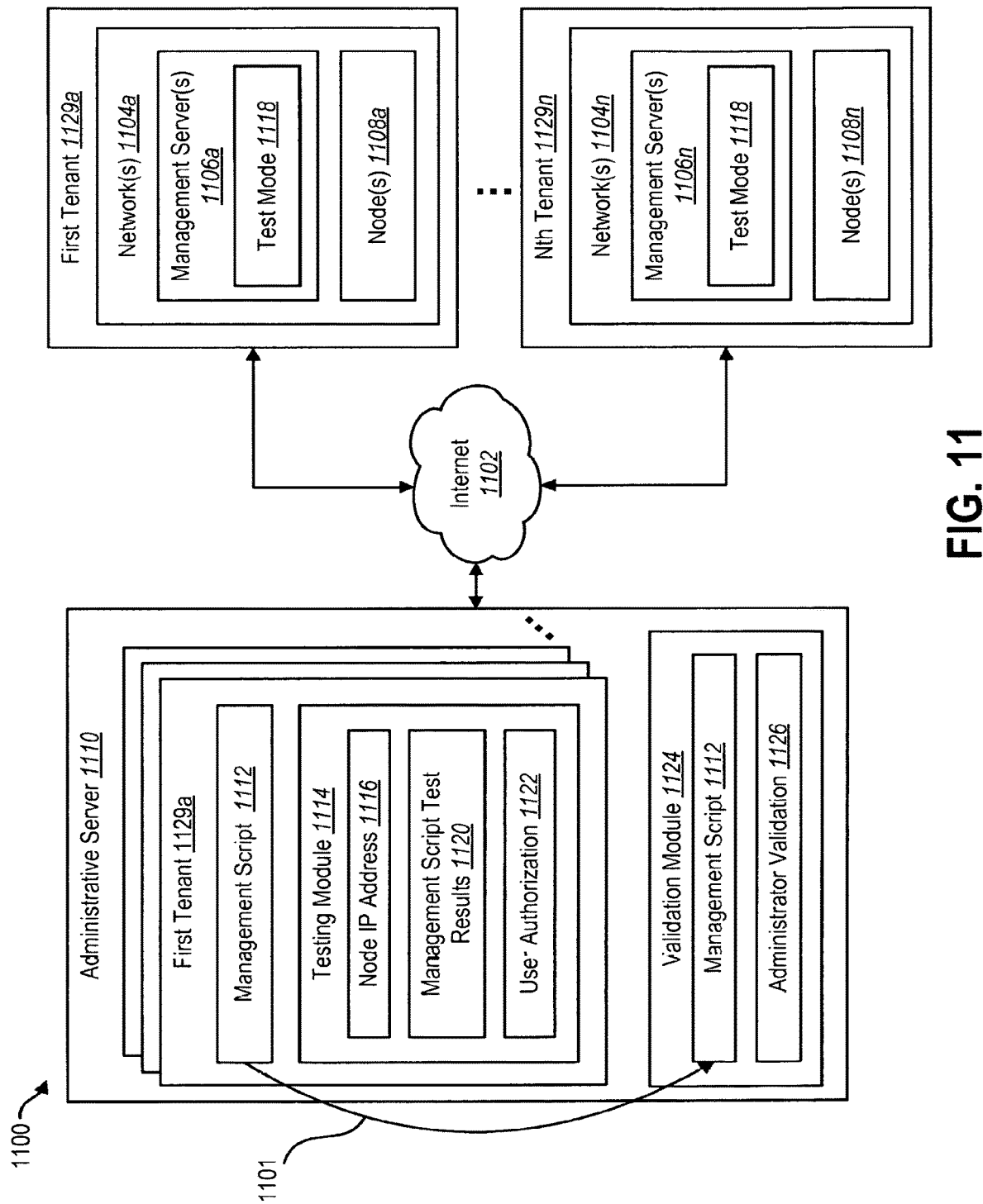
FIG. 11 is a block diagram illustrating another configuration of a cloud-based network that includes a plurality of electronic devices that are in electronic communication with one another.

FIG. 11 is a block diagram illustrating another configuration of a cloud-based network 1100 that includes a plurality of electronic devices that are in electronic communication with one another. The cloud-based network 1100 may be described as a multi-tenant cloud-based architecture. The cloud-based network 1100 may include an administrative server 1110. The administrative server 1110 may be similar to the administrative server 110 and 510 described in connection with FIGS. 1 and 5, respectively. The cloud-based network 1100 may also include one or more tenants 1129a-n that may be accessing the administrative server 1110 via a connection to the Internet 1102. For example, The one or more tenants 1129a-n may be accessing the administrative server 1110 through a user interface similar to the user browser interface 772 described in connection with FIG. 7.

The one or more tenants 1129a-n may include one or more management servers 106a-n on one or more networks 104a-n connected in a similar manner to the configuration described in FIG. 1. The tenants 1129a-n may include one or more enterprises. The tenants 1129a-n may access the administrative server 1110 without interfering with the access or operations of one of the one or more other tenants 1129a-n.

A first tenant 1129a may include a management script 1112. The management script 1112 may be similar to the management script 112, 312 and 512 described in connection with FIGS. 1, 3 and 5. The management script 1112 may be tested on a management server 106a on the first tenant 1129a network 104a using a testing module 1114. The testing module may include a node IP address 1116. The node IP address 1116 may aid the management script 1112 in discovering and configuring a node 108a on the first tenant 1129a network 1104a. For instance, the node IP address 1116 may be received from the first tenant 1129a administrator.

The management script 1112 may be sent to a testing module 1114 for testing. The testing may be similar to the testing described in connection with FIG. 2. The testing module 1114 may further include management script test results 1120 produced by the testing. The testing module 1114 may further include a user authorization 1122 that may be similar to the user authorization 122 and 522 described in connection with FIGS. 1 and 5.

The user authorization 1122 may provide the administrative server 1110 with permission to distribute the management script 1112 to one or more nth tenants 1129n in electronic communication with the administrative server 1110. One or more of the nth tenants 1129n may be one or more different enterprises. Therefore, the cloud-based network 1100 may be a multi-tenant architecture.

In a scenario where the administrative server 1110 receives user authorization 1122 to publicly distribute the management script 1112, the management script 1112 may be sent 1101 to a validation module 1124. The validation module 1124 may include an administrator validation 1126. The administrator validation 1126 and validation module 1124 may be similar to the validation module 124 and 524, and administrator validation 126 and 526 described in connection with FIGS. 1 and 5.

The validation module 1124 may enable an administrator of the administrative server 1110 to validate and authorize the distribution of the management script 1112 to one or more management servers 1106n on one or more networks 1104n. To authorize the distribution of the management script 1112 to one or more management servers 1106n, an administrator may provide an administrator validation 1126 to the validation module 1124. By default the validated management script 1112 maybe automatically applied to each nth tenant 1129n; no nth tenant 1129n authorization is required. Alternately, the nth tenant 1129n administrative user (e.g., a customer) may choose to accept or reject an approved management script 1112 before it is sent to the nth tenant management server 1106n and used to discover and configure nth tenant nodes 1108n. Alternately, before sending a validated management script 1112 to the nth tenant management server 1106n, the nth tenant 1129n administrative user (e.g., a customer) may choose to allow an approved management script 1112 to only discover nth tenant nodes 1108n and not configure them.

Validating a management script 1112 and distributing the script 1112 to one or more networks 1104a-n may enable the administrative server 1110 to better manage nodes 108a-n on multiple networks 1104a-n owned by one or more different enterprises. The validated management script 1112 may be sent to one or more management servers 1106a-n of an entire customer base. For example, the administrative system 1110 may send the validated management script 1112 to one or more management servers 1106a-n on one or more networks 1104a-n operated by one or more enterprises. Each management server 1106a-n on each network 1104a-n may continuously run in a discovery and configuration mode. Therefore, the management servers 1106a-n may immediately execute the management script 1112 to discover and configure a new device on any network 1104a-n, regardless of which enterprise is operating the network 1104a-n. The management servers 1106a-n may also execute the management script 1112 to discover and configure a new device on any network 1104a-n, regardless of the firmware version of the new device.

Prior to receiving the management script 1112, a management server 1106a-n may have detected an unmanageable or unknown node 1108a-n for which it cannot obtain a signature and may have cached that node's 1108a-n IP address. Upon receiving the management script 1112, the management server 1106a-n may attempt to immediately identify and discover the cached unknown nodes 1108a-n (by using, for example, Retrieve Node Identifiers 332 that are specified in the management script 112). If the management script 1112 successfully identifies the node 1108a-n, it is discoverable and may also be configurable.

It is possible for multiple approved management scripts 1112 to discover the same node 1108, therefore the validated management scripts 1112 may be ordered. The administrative server 1110 may order the scripts 1112 (into a list of scripts, for example) when presenting them to the management servers 1106a-n. The management server 1106 will process the scripts 1112 in order when attempting to identify and discover a node 1108. An nth tenant administrative user (e.g., a customer) may choose to add, remove or reorder a copy of the management scripts 1112 before the list of scripts is sent to the nth management server(s) 1106n.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for managing nodes comprising:
   receiving, at a first device, a management script from a second device connected to the first device and a plurality of additional devices, wherein the received management script is untested when received by the first device;
   receiving, at the first device, network address information of an unmanaged node of a set of unmanaged nodes on a network managed by a management server;
   testing, by the first device, the management script, the testing including communication of a request for core parameter data or configuration data from the unmanaged node using the network address information, wherein the request is communicated in at least two communication protocols;
   in response to the core parameter data or the configuration data being received at the management server responsive to the request, generating, by the first device, a test result including the core parameter data or the configuration data;
   sending, by the first device and to the second device, the test result such that the second device validates that the management script returns the core parameter data or the configuration data from the unmanaged node;
   after validation of the management script by the second device, receiving, by the first device, administrator validation to distribute the management script; and
   executing, by the first device, the validated management script, wherein the executing includes sending the validated management script that includes a request in at least two communication protocols for core parameter data or configuration data from unmanaged nodes to one or more of additional management servers on one or more additional networks.

2. The method of claim 1, wherein:
   the first device includes a tenant that is associated with the management server;
   the second device is an administrative computing device; and
   the administrative computing device is connected to the tenant and a plurality of additional tenants associated with a plurality of additional management servers.

3. The method of claim 2, wherein the validated management script is distributed to the tenant and to the plurality of additional tenants from the administrative computing device.

4. The method of claim 1, wherein the executing further includes communicating the validated management script to remaining unmanaged nodes from the set of unmanaged nodes in the network.

5. The method of claim 4, wherein the validated management script includes a request in at least two communication protocols for core parameter data or configuration data.

6. The method of claim 5, further comprising prior to receiving the management script:
   detecting the set of unmanaged nodes using at least one protocol from a set of protocols available to the management server;
   retrieving an identifier for each unmanaged node of the set of unmanaged nodes; and
   storing the identifier for each unmanaged node in a signature cache,
   wherein the executing the validated management script further includes retrieving information associated with each unmanaged node based on the signature cache.

7. The method of claim 1, wherein the test result is sent such that the second device, after receiving the test result, presents the test result to an administrator.

8. The method of claim 7, wherein the test result is presented to enable the administrator to modify the management script based on the test result.

9. The method of claim 8, wherein the validated management script includes a modified management script.

10. The method of claim 1, wherein the at least two communication protocols include simple network management protocol (SNMP), hypertext transfer protocol (HTTP), Telnet, Secure Shell (SSH), or Command Line Interface (CLI).

11. The method of claim 1, wherein the network address information associated with the unmanaged node is an Internet Protocol (IP) address of the unmanaged node.

12. The method of claim 1, wherein the validated management script is configured to use a set of communication protocols that includes the at least two communication protocols.

13. The method of claim 1, wherein the management script is authored by a manufacturer of the set of unmanaged nodes and defines the at least two communication protocols used to communicate with the set of unmanaged nodes.

14. The method of claim 1, wherein the core parameter data includes: a media access control address, a subnet mask, an Internet Protocol (IP) address, a gateway address, or a location of the at least one remaining unmanaged node.

15. The method of claim 1, wherein in response to the core parameter data or the configuration data not being received at the management server responsive to the request:
the test result includes an error message; and
the validated management script is different from the management script.

16. One or more non-transitory computer-readable media having encoded therein programming code executable by one or more processors to perform or control performance of operations of node management, the operations comprising:
receiving, at a first device, a management script from a second device connected to the first device and a plurality of additional devices, wherein the received management script is untested when received by the first device;
receiving, at the first device, network address information of an unmanaged node of a set of unmanaged nodes on a network managed by a management server;
testing, by the first device, the management script, the testing including communication of a request for core parameter data or configuration data from the unmanaged node using the network address information, wherein the request is communicated in at least two communication protocols;
in response to the core parameter data or the configuration data being received at the management server responsive to the request, generating, by the first device, a test result including the core parameter data or the configuration data;
sending, by the first device and to the second device, the test result such that the second device validates that the management script returns the core parameter data or the configuration data from the unmanaged node;
after validation of the management script by the second device, receiving, by the first device, administrator validation to distribute the management script; and
executing, by the first device, the validated management script, wherein the executing includes sending the validated management script that includes a request in at least two communication protocols for core parameter data or configuration data from unmanaged nodes to one or more of additional management servers on one or more additional networks.

17. The one or more non-transitory computer-readable media of claim 16, wherein:
the first device includes a tenant that is associated with the management server;
the second device is an administrative computing device;
the administrative computing device is connected to the tenant and a plurality of additional tenants associated with a plurality of additional management servers; and
the validated management script is distributed to the tenant and to the plurality of additional tenants from the administrative computing device.

18. The one or more non-transitory computer-readable media of claim 16, wherein:
the operations further comprise prior to receiving the management script:
detecting the set of unmanaged nodes using at least one protocol from a set of protocols available to the management server;
retrieving an identifier for each unmanaged node of the set of unmanaged nodes; and
storing the identifier for each unmanaged node in a signature cache;
the executing the validated management script further includes retrieving information associated with each unmanaged node based on the signature cache and communicating the validated management script to remaining unmanaged nodes from the set of unmanaged nodes in the network a request in at least two communication protocols for core parameter data or configuration data.

19. The one or more non-transitory computer-readable media of claim 16, wherein:
the at least two communication protocols include simple network management protocol (SNMP), hypertext transfer protocol (HTTP), Telnet, Secure Shell (SSH), or Command Line Interface (CLI);
the network address information associated with the unmanaged node is an Internet Protocol (IP) address of the unmanaged node;
the validated management script is configured to use a set of communication protocols that includes the at least two communication protocols; and
the core parameter data includes: a media access control address, a subnet mask, an Internet Protocol (IP) address, a gateway address, or a location of the at least one remaining unmanaged node.

20. The one or more non-transitory computer-readable media of claim 16, wherein in response to the core parameter data or the configuration data not being received at the management server responsive to the request:
the test result includes an error message; and
the validated management script is different from the management script.

* * * * *